United States Patent
Fukuda (10) Patent No.: US 9,415,325 B2
(45) Date of Patent: Aug. 16, 2016

(54) CRYOPUMP, METHOD OF REGENERATING CRYOPUMP, AND CONTROL DEVICE FOR CRYOPUMP

(71) Applicant: SUMITOMO HEAVY INDUSTRIES, LTD., Tokyo (JP)

(72) Inventor: Tsutomu Fukuda, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 412 days.

(21) Appl. No.: 13/771,858

(22) Filed: Feb. 20, 2013

(65) Prior Publication Data

US 2013/0219924 A1    Aug. 29, 2013

(30) Foreign Application Priority Data

Feb. 23, 2012  (JP) .................................. 2012-037239

(51) Int. Cl.
*B01D 8/00* (2006.01)
*F04B 37/08* (2006.01)

(52) U.S. Cl.
CPC .. *B01D 8/00* (2013.01); *F04B 37/08* (2013.01)

(58) Field of Classification Search
CPC .......... F04B 37/085; F04B 37/08; B01D 8/00
USPC ........................................................ 62/55.5
See application file for complete search history.

(56) References Cited

U.S. PATENT DOCUMENTS

| | | | | |
|---|---|---|---|---|
| 4,667,477 A | * | 5/1987 | Matsuda et al. | 62/55.5 |
| 5,211,022 A | * | 5/1993 | Bartlett | F04B 37/08 417/901 |
| 5,582,017 A | * | 12/1996 | Noji et al. | 62/55.5 |
| 5,687,575 A | * | 11/1997 | Keville | 62/55.5 |
| 6,116,032 A | * | 9/2000 | Mori et al. | 62/55.5 |
| 6,257,001 B1 | * | 7/2001 | Muldowney et al. | 62/55.5 |
| 2001/0012485 A1 | * | 8/2001 | Gaudet | F04B 37/08 417/53 |
| 2007/0256429 A1 | * | 11/2007 | Fukuda | 62/55.5 |
| 2009/0280988 A1 | * | 11/2009 | Koizumi et al. | 505/162 |
| 2011/0147198 A1 | * | 6/2011 | Okada | F04B 37/08 204/192.1 |

FOREIGN PATENT DOCUMENTS

| | | |
|---|---|---|
| JP | 63-4380 U | 1/1988 |
| JP | 08-068380 A | 3/1996 |
| JP | 2004-027866 A | 1/2004 |

* cited by examiner

*Primary Examiner* — Allen Flanigan
*Assistant Examiner* — Filip Zec
(74) *Attorney, Agent, or Firm* — Michael Best and Friedrich (57) ABSTRACT

A cryopump includes: a first panel to be cooled by a first stage of a refrigerator; a second panel to be cooled by a second stage of the refrigerator; a panel temperature sensor provided with the first panel and/or the second panel; a stage temperature sensor provided with the first stage and/or the second stage; and a control unit that controls vacuum pumping based on the temperature measured by the stage temperature sensor. The control unit controls regeneration including a heating process of a cryopanel, and uses the temperature measured by the panel temperature sensor exclusively in the regeneration. The control unit completes the heating process based on the temperature measured by the panel temperature sensor.

13 Claims, 5 Drawing Sheets

FIG.5

CRYOPUMP, METHOD OF REGENERATING CRYOPUMP, AND CONTROL DEVICE FOR CRYOPUMP

BACKGROUND OF THE INVENTION

1. Field of the Invention

The present invention relates to a cryopump, a method of regenerating the cryopump, and a control device for the cryopump.

2. Description of the Related Art

A cryopump is a vacuum pump that traps gas molecules by condensing or adsorbing them on cryopanels cooled to an ultra cold temperature so as to evacuate them. A cryopump is generally used to attain a clean vacuum environment required for a semiconductor circuit manufacturing process or the like. In order to discharge the gas accumulated on the cryopanel to the outside, the cryopump is regenerated regularly.

A temperature sensor is generally provided on the cryopump. The temperature sensor is mounted, for example, directly on the cryopanel. Alternatively, the temperature sensor is mounted on a refrigerator for cooling the cryopanel.

SUMMARY OF THE INVENTION

According to an aspect of the present invention, there is provided a cryopump including a refrigerator including a first stage and a second stage to be cooled to a temperature lower than that of the first stage; a cryopanel including a first panel to be cooled by the first stage and a second panel to be cooled by the second stage; a panel temperature sensor provided with at least one of the first panel and the second panel; a stage temperature sensor provided with at least one of the first stage and the second stage; and a control unit configured to control vacuum pumping based on a temperature measured by the stage temperature sensor and regeneration including a heating process of the cryopanel, and to exclusively use a temperature measured by the panel temperature sensor in the regeneration, wherein the control unit completes the heating process based on the temperature measured by the panel temperature sensor.

According to an aspect of the present invention, there is provided a method of regenerating a cryopump, including: controlling vacuum pumping based on the temperature measured by a stage temperature sensor; and controlling regeneration including a heating process of a cryopanel, wherein the heating process includes completing the heating process based on the temperature measured by a panel temperature sensor and the temperature measured by the panel temperature sensor is exclusively used for the regeneration.

According to an aspect of the present invention, there is provided a control device for a cryopump. The control device is shared by a plurality of cryopump models including a first model and a second model having different bores from each other. The first model is a cryopump having a small bore and configured to heat a first panel late, and the second model is a cryopump having a large bore and configured to heat a second panel late. A setting of a place to measure a temperature for determining completion of a heating process is configured to be selectable between the first panel and the second panel.

According to an aspect of the present invention, there is provided a control device for a cryopump. The device is configured to select, for each model of the cryopump, a temperature sensor used for determining completion of a heating process.

Note that any combination of the components, and any rearrangement of the components and/or expressions of the present invention between methods, devices, systems, and programs with each other are also effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The temperature of a cryopanel changes in a considerably wide range during operation of a cryopump. The cryopanel is cooled to an cryogenic temperature in vacuum pumping, while the cryopanel is heated to a room temperature or a temperature somewhat higher than that in regeneration. When the vacuum pumping is stopped so as to heat the cryopanel for the regeneration, a great temperature difference may transiently develop between parts of the cryopanel.

One of the effective methods for easily obtaining a uniformly heated cryopanel is to take a long time for heating. Generally, during the heating, the cryopanel is heated by a heat source and a purge gas is introduced into the cryopump. For example, in this case, there can be considered a method for making the temperature of the cryopanel uniform by continuing the retention of the purge gas inside the cryopump for a certain period of time after the temperature of a part adjacent to the heat source of the cryopanel has reached a target temperature. A heat transfer via the purge gas is useful for making a temperature distribution of the cryopanel uniform to the target temperature. There may be a practical measure that ensures an uniformization by lengthening the duration of a purging for a considerable period of time. However, such a measure does not always match one of the most important requests, which is a reduction of the regeneration time, for the cryopump.

When many temperature sensors are provided on the cryopanel, the control to uniformly heat the cryopanel in a short time may be possible. However, from the viewpoint of minimizing a manufacturing cost of the cryopump, it may not be realistic to provide many temperature sensors on the cryopanel.

One of exemplary purposes of an aspect of the present invention is to provide a cryopump having a small number of temperature sensors arranged to be useful for shortening a heating time, a method of regeneration and a control device suitable for the cryopump.

A cryopump of an aspect of the present invention includes a refrigerator including a first stage and a second stage cooled to a lower temperature than the first stage; a cryopanel including a first panel cooled by the first stage and a second panel cooled by the second stage; a panel temperature sensor provided with the first panel and/or the second panel; a stage temperature sensor provided with the first stage and/or the second stage; a control unit that controls a vacuum pumping based on a temperature measured by the stage temperature sensor and a regeneration including a heating process of the cryopanel and is configured to use a temperature measured by the panel temperature sensor exclusively in the regeneration. The heating process is completed by the control unit based on the temperature measured by the panel temperature sensor.

In a transient situation such as a heating process, in which a comparatively great temperature difference is caused, the stage temperature sensor does not always accurately reflect a cryopanel temperature. By determining the completion of the heating process based on the temperature measured by the panel temperature sensor, it is possible to appropriately stop the heating process without unnecessarily continuing the same.

The temperature measured by the panel temperature sensor is exclusively used for the regeneration. That is, the temperature measured by the panel temperature sensor is not used for controlling the vacuum pumping. The vacuum pumping is controlled based on the temperature measured by the stage temperature sensor. This is based on empirical findings of the inventor that the measured temperature of the cryopanel is not always suitable for controlling the cryopanel temperature in the vacuum pumping. By assigning the roles such that panel temperature sensor is only used for the regeneration and the stage temperature sensor is mainly used for the vacuum pumping, the cryopump can be effectively managed by a small number of temperature sensors.

The control unit may control the heating operation of the refrigerator to heat the cryopanel, and may monitor the temperature measured by the stage temperature sensor during the heating operation. The control unit may stop the heating operation of the refrigerator when the temperature measured by the stage temperature sensor has reached a warning temperature.

In this case, the cryopanel is heated, through so-called reverse-rotation heating, by the refrigerator as a heat source. There is an advantage that the cryopump does not need to have a heater other than the refrigerator. By stopping the reverse-rotation heating at the warning temperature, the refrigerator can be protected. For example, seizure of a movable element in the refrigerator can be prevented.

The panel temperature sensor may have a measurable temperature range including a heating target temperature in the heating process. The measurable temperature range may be a temperature range higher than a cooling target temperature of the cryopanel in the vacuum pumping.

The measurable temperature range of the panel temperature sensor does not include the cooling target temperature of the cryopanel in the vacuum pumping. By bringing such a cryogenic temperature out of the measuring range, a general-purpose temperature sensor can be easily adopted. Since the heating target temperature is generally around a room temperature, a general sensor such as a thermocouple may be used as the panel temperature sensor. The adoption of the general-purpose temperature sensor is useful to reduce a manufacturing cost.

The cryopump may include a first panel temperature sensor provided on an end part of a heat transfer path in the first panel and a second panel temperature sensor provided on an end part of a heat transfer path in the second panel. The control unit may complete the heating process when the temperature measured by the first panel temperature sensor reaches a target temperature of the first panel, and the temperature measured by the second panel temperature sensor reaches a target temperature of the second panel.

The temperature of the end part of the heat transfer path is lower than that of other locations in the heating process because of a distance from the heat source. Therefore, when the measured temperature of the end part of the heat transfer path reaches the target temperature, it can be evaluated that the temperature of the other locations has reached the target temperature.

The cryopanel may be configured such that, in the heating process, the first panel reaches its heating target temperature after the second panel reaches its heating target temperature. The panel temperature sensor may be provided at least with the first panel. The control unit may complete the heating process based on a measured temperature of the first panel.

For example, when a first panel mass relative to a heating capability for the first panel is large in comparison with a second panel mass relative to a heating capability for the second panel, the first panel tends to take longer to be heated than the second panel. In such a case, the completion of the heating process can be determined based on the measured temperature of the first panel since the heating of the second panel is expected to be finished earlier.

The cryopanel may be configured such that, in the heating process, the second panel reaches its heating target temperature after the first panel reaches its heating target temperature. The panel temperature sensor may be provided at least with the second panel. The control unit may complete the heating process based on a measured temperature of the second panel.

For example, when the second panel mass relative to the heating capability for the second panel is large in comparison with the first panel mass relative to the heating capability for the first panel, the second panel tends to take longer to be heated than the first panel. In such a case, the completion of the heating process can be determined based on the measured temperature of the second panel since the heating of the first panel is expected to be finished earlier.

Another aspect of the present invention is a control device for the cryopump. The device is shared by a plurality of models of the cryopumps including a first model and a second model having different bores from each other. The first model is a small-bore cryopump configured to heat the first panel after the second panel. The second model is a large-bore cryopump configured to heat the second panel after the first panel. The first panel or the second panel can be selected as the place to measure the temperature for determining the completion of the heating process.

According to this aspect, the control device, which is shared by the plurality of models of the cryopumps, is provided. The place to measure the temperature for determining the completion of the heating process can be set for each model. By an appropriate setting, the heating process for each model can be shortened.

Figure 1:
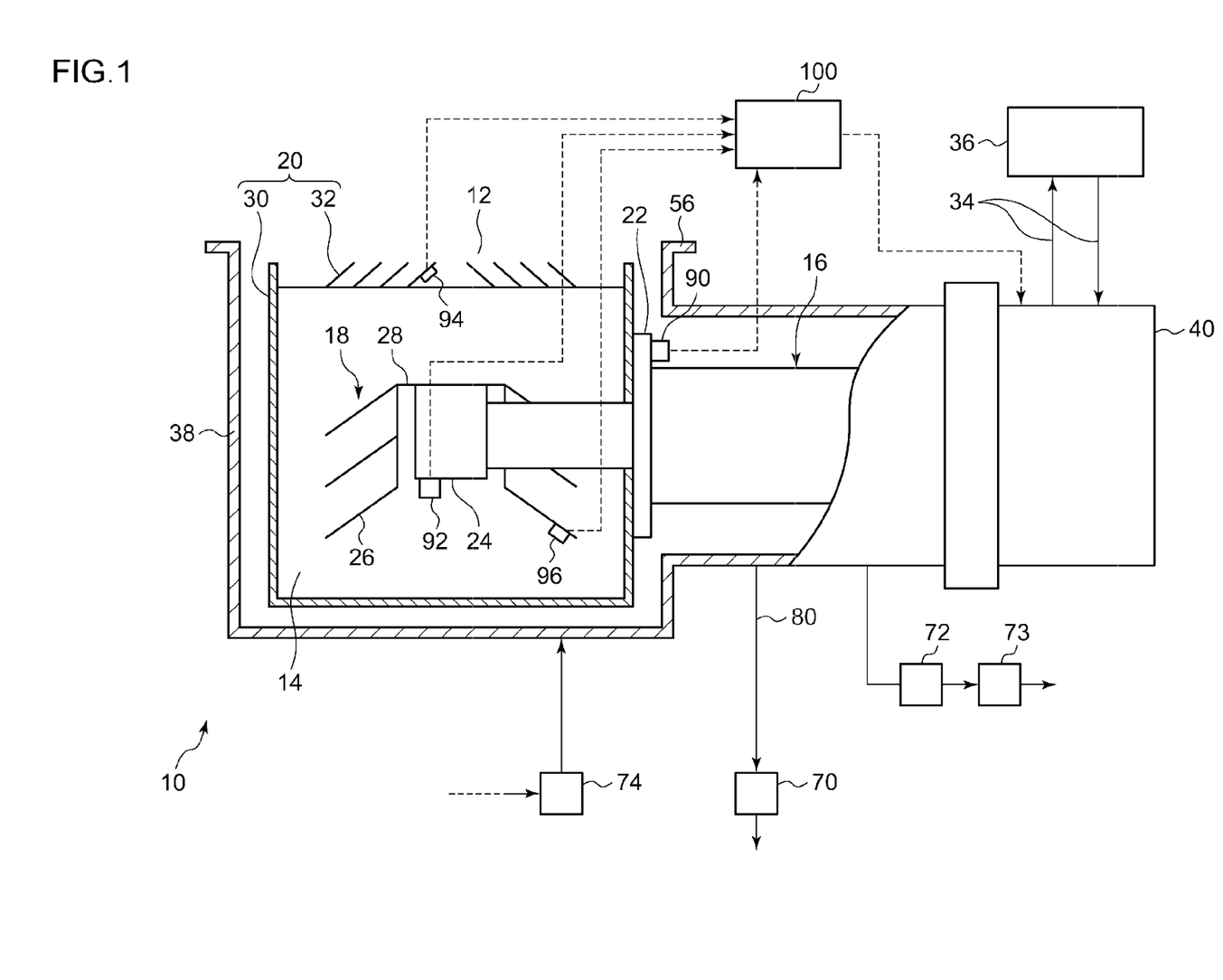
FIG. 1 schematically shows a cryopump according to an exemplary embodiment of the present invention.

FIG. 1 schematically shows a cryopump 10 according to an exemplary embodiment of the present invention. The cryopump 10 is mounted to a vacuum chamber of, for example, an ion implantation apparatus or a sputtering apparatus and used to increase the vacuum level inside the vacuum chamber to a level required for a desired process.

The cryopump 10 has an inlet 12 through which a gas is introduced. The inlet 12 is an entrance to an internal space 14 of the cryopump 10. A gas to be evacuated enters the internal space 14 of the cryopump 10 through the inlet 12 from the vacuum chamber, to which the cryopump 10 is mounted.

Hereinafter, the terms "axial direction" and "radial direction" may be used for easy understanding of the positional relationship among the structural components of the cryopump 10. The axial direction represents the direction passing through the inlet 12. The radial direction represents the direction along the inlet 12. For convenience, with respect to the axial direction, a place relatively close to the inlet 12 may be referred to as "upper", and a place relatively far from the inlet 12 may be referred to as "lower". That is, the place relatively far from the base of the cryopump 10 may be referred to as "upper", and the place relatively close to the base may be referred to as "lower". With respect to the radial direction, a place close to the center of the inlet 12 may be referred to as "inside" and a place close to the outer edge of the inlet 12 may be referred to as "outside". These expressions do not relate to an arrangement in which the cryopump 10 is mounted to the vacuum chamber. For example, the cryopump 10 may be mounted to the vacuum chamber in the vertical direction with the inlet 12 facing downward.

FIG. 1 shows a cross section including a central axis of the internal space 14 of the cryopump 10 and a refrigerator 16. The cryopump 10 includes the refrigerator 16, a second panel 18, and a first panel 20.

The refrigerator 16 is a cryogenic refrigerator, for example, a Gifford-McMahon refrigerator (so-called GM refrigerator). The refrigerator 16 is a two-stage refrigerator having a first stage 22 and a second stage 24.

The refrigerator 16 is coupled to a compressor 36 via a refrigerant pipe 34. The compressor 36 supplies a high-pressure operating gas to the refrigerator 16. The high-pressure operating gas is adiabatically expanded in an expansion chamber inside the refrigerator 16 so that cooling occurs. The compressor 36 compresses a low-pressure operating gas that returns from the refrigerator 16. The operating gas is helium, for example. The flows of the operating gas from the compressor 36 to the refrigerator 16 and from the refrigerator 16 to the compressor 36 can be switched by a rotary valve (not shown) inside the refrigerator 16. The refrigerator 16 has a valve drive motor 40. The valve drive motor 40 rotates the rotary valve with power supplied from an external power source.

The refrigerator 16 is configured to cool the first stage 22 to a first temperature level, and cool the second stage 24 to a second temperature level. The second temperature level is lower than the first temperature level. For example, the first stage 22 is cooled to about 65 K to 120 K, preferably to 80 K to 100 K and the second stage 24 is cooled to about 10 K to 20 K.

The cryopump 10 illustrated in FIG. 1 is a so-called horizontal-type cryopump. The horizontal-type cryopump is generally a cryopump in which the refrigerator 16 is arranged to intersect with (typically orthogonal to) the central axis of the internal space 14 of the cryopump 10. The present invention is also applicable to a so-called vertical-type cryopump in a similar way. The vertical-type cryopump is a cryopump in which the refrigerator is arranged along the axial direction of the cryopump.

The second panel 18 is provided in a central part of the internal space 14 of the cryopump 10. The second panel 18 includes, for example, a plurality of panel members 26. Each of the panel members 26 has a shape of the side surface of a truncated cone, i.e., an umbrella-like shape. Typically, an adsorbent (not shown), such as charcoal, is provided on each panel member 26. The adsorbent is attached to, for example, the back face of the panel member 26. The panel member 26 is mounted to a panel mounting member 28. The panel mounting member 28 is mounted to the second stage 24. In this way, the second panel 18 is thermally connected to the second stage 24. Therefore, the second panel 18 is cooled to the second temperature level.

The first panel 20 is provided outside the second panel 18. The first panel 20 includes a radiation shield 30 and an inlet cryopanel 32, and surrounds the second panel 18. The first panel 20 is thermally connected to the first stage 22 so that the first panel 20 is cooled to the first temperature level.

Mainly, the radiation shield 30 is provided to protect the second panel 18 against radiation heat from a housing 38 of the cryopump 10. The radiation shield 30 is provided between the housing 38 and the second panel 18 and surrounds the second panel 18. The upper end in the axial direction of the radiation shield 30 is opened toward the inlet 12. The radiation shield 30 has a shape of a tube (for example, a cylinder), of which the lower end in the axial direction is closed, and is formed in a cup-like shape. An opening for mounting the refrigerator 16 is formed on the side surface of the radiation shield 30. The second stage 24 is inserted into the radiation shield 30 through the opening. At the periphery of the mounting opening, the first stage 22 is fixed on the outer surface of the radiation shield 30. In this way, the radiation shield 30 is thermally connected to the first stage 22.

The radiation shield 30 may be formed as a one-piece cylinder as illustrated in FIG. 1. Alternatively, a plurality of parts may form a cylindrical shape as a whole. The plurality of parts may be arranged so as to have a gap between one another. For example, the radiation shield 30 may be divided into an upper shield attached to the upper side in the axial direction of the first stage 22 and a lower shield attached to the lower side in the axial direction of the first stage 22. In this case, the upper shield is a cylindrical panel with its upper and lower ends opened, and the lower shield is a cylindrical panel with its upper end opened and its lower end closed.

The inlet cryopanel 32 is provided above the second panel 18 in the axial direction, and is arranged along the radial direction in the inlet 12. The periphery of the inlet cryopanel 32 is fixed to the open end of the radiation shield 30 and is thermally connected to the radiation shield 30. The inlet cryopanel 32 is formed as, for example, a louver structure or a chevron structure. The inlet cryopanel 32 may be formed in a circular shape concentrically arranged around the central axis of the radiation shield 30 or may be formed in another shape such as a lattice.

The inlet cryopanel 32 is provided to evacuate a gas flowing into the inlet 12. The gas (i.e., water vapor) condensed at the temperature of the inlet cryopanel 32 is trapped on the surface of the inlet cryopanel 32. The inlet cryopanel 32 is provided to protect the second panel 18 against the radiation heat from a heat source outside the cryopump 10 (for example, a heat source in the vacuum chamber to which the cryopump 10 is mounted). The entry of the radiation heat as well as gas molecules is limited. The inlet cryopanel 32 occupies a part of the opening area of the inlet 12 so as to limit the inflow of the gas, to the internal space 14 through the inlet 12, to a desired amount.

The cryopump 10 includes the housing 38. The housing 38 is a vacuum vessel for separating the inside of the cryopump 10 from the outside thereof. The housing 38 is configured to airtightly maintain the pressure of the internal space 14 of the cryopump 10. In the housing 38, the first panel 20 and the refrigerator 16 are accommodated. The housing 38 is provided outside the first panel 20 and surrounds the first panel 20. The refrigerator 16 is accommodated in the housing 38.

The housing 38 is fixed to a part having an external environment temperature (for example, a high temperature part of the refrigerator 16) without contact with the first panel 20 and a low temperature part of the refrigerator 16. The outer surface of the housing 38 is exposed to the external environment and has a higher temperature (i.e., about a room temperature) than the first panel 20 being cooled.

The housing 38 includes an inlet flange 56 extending outward in the radial direction from its open end. The inlet flange 56 is used for mounting the cryopump 10 to the vacuum chamber, to which the cryopump 10 is to be mounted. A gate valve is provided in an opening of the vacuum chamber (not shown), and the inlet flange 56 is mounted to the gate valve. The gate valve is located above the inlet cryopanel 32 in the axial direction in this way. For example, when regenerating the cryopump 10, the gate valve is closed, and when the cryopump 10 evacuates the vacuum chamber, the gate valve is opened.

The housing 38 is connected to a vent valve 70, a rough valve 72, and a purge valve 74.

The vent valve 70 is provided on, for example, the end of an exhaust line 80 for exhausting fluid from the internal space of the cryopump 10 to an external environment. By opening the vent valve 70, the flow of fluid in the exhaust line 80 is permitted, and by closing the vent valve 70, the flow of fluid in the exhaust line 80 is blocked. Although the fluid to be exhausted is basically gas, the fluid may be liquid or a mixture of gas-liquid. For example, liquefied gas that has been condensed by the cryopump 10 may be mixed with the fluid to be exhausted. By allowing the vent valve 70 to open, the positive pressure generated in the housing 38 can be released to the outside.

The rough valve 72 is connected to a rough pump 73. Opening of the rough valve 72 opens a passage between the rough pump 73 and the cryopump 10, while closing of the rough valve 72 blocks the passage. The rough pump 73 is typically provided as a vacuum apparatus separate from the cryopump 10, and forms, for example, a part of a vacuum system including a vacuum chamber to which the cryopump 10 is connected.

The purge valve 74 is connected to a purge gas supply device (not shown). The purge gas is, for example, a nitrogen gas. By opening/closing the purge valve 74, the supply of the purge gas to the cryopump 10 is controlled.

The cryopump 10 includes a first stage temperature sensor 90 to measure the temperature of the first stage 22 and a second stage temperature sensor 92 to measure the temperature of the second stage 24. The first stage temperature sensor 90 is mounted on the first stage 22. The second stage temperature sensor 92 is mounted on the second stage 24. Hereinafter, for convenience in description, the first stage temperature sensor 90 and the second stage temperature sensor 92 may be collectively referred to as a "stage temperature sensor".

The stage temperature sensor is used for monitoring each of the stage temperatures in both the vacuum pumping operation and the regeneration operation of the cryopump 10. Therefore, the stage temperature sensor has a measurable temperature range including both a stage temperature during the vacuum pumping and a stage temperature during the regeneration. That is, the stage temperature sensor is configured to measure not only the room temperature but also the cryogenic temperature, for example, equal to or lower than 20 K. The stage temperature sensor is, for example, a platinum resistance thermometer or a hydrogen vapor pressure thermometer.

The cryopump 10 includes a first panel temperature sensor 94 to measure the temperature of the first panel 20 and a second panel temperature sensor 96 to measure the temperature of the second panel 18. The first panel temperature sensor 94 is provided on an end part of a heat transfer path in the first panel 20. The second panel temperature sensor 96 is provided on an end part of a heat transfer path in the second panel 18.

Here, the end part of the heat transfer path is a place far from the heat source during the heating of the cryopanel. For example, according to the length of the heat transfer path from the heat source to a certain point on the panel, the first panel 20 can be divided into a region close to the heat source (the heat transfer path is short) and a region far from the heat source (the heat transfer path is long). Alternatively, in a similar way, the first panel 20 can be divided into three regions, i.e., a region close to the heat source, a region in the middle, and a region far from the heat source. The second panel 18 can be divided in the same way. At this time, a region far from the heat source may be considered as the end part of the heat transfer path. When the refrigerator 16 is in the heating operation, the first stage 22 and the second stage 24 may be respectively considered as the heat sources of the first panel 20 and the second panel 18. When a heater for heating is provided on the first panel 20 and/or the second panel 18, the heater is the heat source.

In FIG. 1, the first panel temperature sensor 94 is provided on the inlet cryopanel 32. Specifically, the first panel temperature sensor 94 is provided at the central part of the inlet cryopanel 32. As an alternative, the first panel temperature sensor 94 may be provided at the open end or a blocked end of the radiation shield 30. The second panel temperature sensor 96 is provided at the end of the panel member 26 farthest from the second stage 24 on the second panel 18. Hereinafter, for convenience in description, the first panel temperature sensor 94 and the second panel temperature sensor 96 may be collectively referred to as "panel temperature sensor".

The panel temperature sensor is used for monitoring each of the panel temperatures during the regeneration. The panel temperature sensor has a measurable temperature range including the heating target temperature in the heating process. In the present exemplary embodiment, the panel temperature sensor is not used during the vacuum pumping so that the panel temperature sensor may not include a cryogenic temperature in the measurable temperature range. In short, it is only necessary for the panel temperature sensor to measure the room temperature level. Therefore, for example, an inexpensive thermocouple can be used as the panel temperature sensor.

The cryopump 10 includes a control unit 100. The control unit 100 may be integrated with the cryopump 10 or may be configured as a control device separate from the cryopump 10.

The control unit 100 is configured to control the refrigerator 16 for the vacuum pumping operation and the regeneration operation of the cryopump 10. The control unit 100 controls, as necessary, the opening/closing of the vent valve 70, the rough valve 72, and the purge valve 74 mainly during the regeneration. The control unit 100 is configured to receive a measured result of each sensor such as the first stage temperature sensor 90, the second stage temperature sensor 92, the first panel temperature sensor 94, the second panel temperature sensor 96, and a pressure sensor (not shown). The control unit 100 generates a control instruction to be provided to the refrigerator 16 and/or the valves based on the measured result.

In the vacuum pumping operation, the control unit 100 controls the refrigerator 16 so that the stage temperature follows the target cooling temperature. The target temperature of the first stage 22 is typically set to a constant value. The target temperature of the first stage 22, for example, is determined as a specification according to a process performed in the vacuum chamber to which the cryopump 10 is mounted.

For example, the control unit 100 controls a operation frequency of the refrigerator 16 by feedback control so as to minimize a deviation between the target temperature of the first stage 22 and the temperature measured by the first stage temperature sensor 90. That is, the control unit 100 controls a frequency of a thermal cycle in the refrigerator 16 by controlling the rotation number of the valve drive motor 40.

When a thermal load to the cryopump 10 is increased, the temperature of the first stage 22 may be increased. When the temperature measured by the first stage temperature sensor 90 is higher than the target temperature, the control unit 100 increases the operation frequency of the refrigerator 16. As a result, the frequency of the thermal cycle in the refrigerator 16 is increased and the first stage 22 is cooled to the target temperature. Conversely, when the temperature measured by the first stage temperature sensor 90 is lower than the target temperature, the operation frequency of the refrigerator 16 is reduced so that the first stage 22 is heated to the target temperature.

In a typical cryopump, the frequency of the thermal cycle is maintained constant. The cryopump is set to operate at a relatively high frequency so as to cool rapidly from the ambient temperature to a pump operation temperature. The temperature of the cryopanel is adjusted through heating by a heater when a thermal load from outside is small. Therefore, the power consumption is increased. On the other hand, in the present exemplary embodiment, a thermal cycle frequency is controlled according to the thermal load to the cryopump 10, a cryopump with high energy saving capability can be realized. The heater does not necessarily need to be provided, which also contributes to a reduction in the power consumption.

Hereinafter, controlling the refrigerator 16 to make the temperature of the first stage 22 be the target temperature may be referred to as "first-stage temperature control". When the cryopump 10 is in the vacuum pumping operation, the first-stage temperature control is generally executed. As a result of the first-stage temperature control, the second stage 24 and the second panel 18 are cooled to the temperature determined by the specifications of the refrigerator 16 and a thermal load from outside.

In a similar way, the control unit 100 can execute "second-stage temperature control", i.e., controlling the refrigerator 16 to make the temperature of the second stage 24 be the target temperature. The control unit 100 may execute the second-stage temperature control, for example, in a cool-down process that is preparation for starting the vacuum pumping of the cryopump 10. In the cool-down process, it is preferable to cool the cryopanel rapidly. Therefore, the control unit 100 may execute the second-stage temperature control in the cool-down process and may switch to the first-stage temperature control when the second panel 18 is cooled to near the target temperature.

As described above, in the present exemplary embodiment, the stage temperature is used for the temperature control of the cryopanel in the vacuum pumping operation. This is based on empirical findings of the inventor. The temperature, which is obtained by directly measuring the cryopanel, is not always suitable for the temperature control of the cryopanel.

Seemingly, it appears that a good result can be obtained by controlling the cryopanel temperature based on a measured value of the panel temperature sensor since the panel temperature sensor is directly provided on the cryopanel. Actually, however, that is not always correct. The measured value of the panel temperature sensor may fluctuate in comparison with that of the stage temperature sensor. This is because the panel temperature is comparatively sensitively changed by the effect of a radiation heat from outside and/or a deposited ice layer of gases. It is preferable that the cryopanel temperature during the vacuum pumping be stable; therefore, the cryopanel temperature control is preferably executed based on the measured value of the stage temperature sensor. In the present exemplary embodiment, therefore, the temperature measured by the panel temperature sensor is not used for the control of the vacuum pumping operation. The temperature measured by the panel temperature sensor is exclusively used in the regeneration, especially in the heating process.

An explanation on the operations of the cryopump 10 with the aforementioned configuration will be given below. When activating the cryopump 10, the inside of the cryopump 10 is first roughly evacuated to approximately 1 Pa by using a rough pump 73 through the rough valve 72 before starting operation. Thereafter, the cryopump 10 is operated. Under the control of the control unit 100, the first stage 22 and the second stage 24 are cooled by driving the refrigerator 16, and the first panel 20 and the second panel 18, which are respectively thermally connected to the first stage 22 and the second stage 24, are cooled.

The inlet cryopanel 32 cools the gas molecules flowing from the vacuum chamber into the cryopump 10 so that a gas whose vapor pressure is sufficiently low at the cooling temperature (e.g., water vapor) will be condensed and pumped on the surface of the inlet cryopanel 32. A gas whose vapor pressure is not sufficiently low at the cooling temperature of the inlet cryopanel 32 passes through the inlet cryopanel 32 and enters the radiation shield 30. Of the gas molecules that have been entered, a gas whose vapor pressure is sufficiently low at the cooling temperature of the second panel 18 will be condensed and pumped on the surface of the second panel 18. A gas whose vapor pressure is not sufficiently low at the cooling temperature (e.g., hydrogen) is adsorbed and evacuated by an adsorbent, which is attached to the surface of the second panel 18 and cooled. In this way, the cryopump 10 can attain a desired degree of vacuum in the vacuum chamber to which the cryopump 10 is mounted.

As pumping operation continues, gas is accumulated in the cryopump 10. In order to discharge the accumulated gas to the outside, a regeneration of the cryopump 10 is executed when a predetermined time period has passed after starting the pumping operation or when a predetermined condition for starting the regeneration is satisfied. A regeneration procedure includes a heating process, a discharging process, and a cooling process.

The regeneration procedure of the cryopump 10 is controlled, for example, by the control unit 100. The control unit 100 determines whether or not the predetermined condition for starting the regeneration is satisfied, and in the case where the condition is satisfied, starts to regenerate the cryopump. In this case, the control unit 100 stops the cooling operation of the refrigerator 16 for cooling the cryopanels and starts the heating operation of the refrigerator 16. In the case where the condition is not satisfied, the control unit 100 does not start the regeneration and, for example, continues the vacuum pumping operation.

Figure 2:
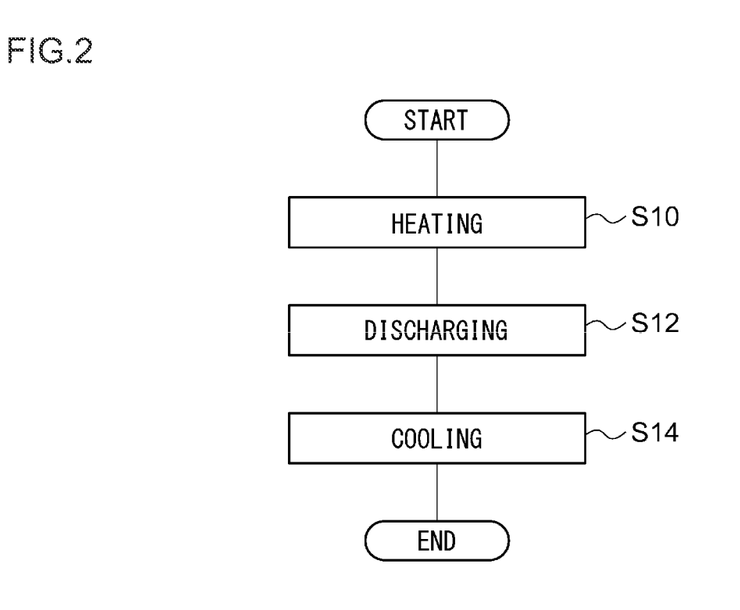
FIG. 2 shows a flowchart for illustrating a regeneration method according to an exemplary embodiment of the present invention.

FIG. 2 shows a flowchart for illustrating a regeneration method according to an exemplary embodiment of the present invention. The regeneration procedure includes a heating process for heating the cryopump 10 to a regeneration temperature, which is higher than the temperature of the cryopanels during the pumping operation (S10). The exemplary regeneration procedure shown in FIG. 2 is so-called full regeneration. The full regeneration regenerates all cryopanels including the first panel 20 and the second panel 18 of the cryopump 10. The cryopanels are heated from a cooling temperature for vacuum pumping operation to the regeneration temperature. The regeneration temperature is, for example, a room temperature or a temperature slightly higher than that (for example, about 290 K to about 300 K).

The heating process includes reverse-rotation heating. According to an exemplary embodiment, the reverse-rotation heating differentiates a timing of intake/discharge of operating gas from that of the cooling operation so as to cause adiabatic compression to the operating gas by rotating the rotary valve in the refrigerator 16 in the reverse direction from that of the cooling operation. By compression heat obtained in this manner, the refrigerator 16 heats the first stage 22 and the second stage 24. The first panel 20 is heated by using the first stage 22 as the heat source, and the second panel 18 is heated by using the second stage 24 as the heat source.

The control unit 100 determines whether or not a measured value of the cryopanel temperature has reached the target temperature. The control unit 100 continues to heat the cryopanel until the cryopanel temperature reaches the target temperature and the heating process is completed in the case where the temperature reaches the target temperature. The detail on the heating process will be described below with reference to FIG. 3.

When the heating process is completed, the control unit 100 starts the discharging process (S12). In the discharging process, a gas, which is re-evaporated from the surface of the cryopanels, is discharged to the outside of the cryopump 10. The re-evaporated gas is discharged to the outside, for example, via the exhaust line 80, or by using the rough pump 73. The re-evaporated gas is exhausted from the cryopump 10 with the purge gas that is introduced as necessary. In the discharging process, the operation of the refrigerator 16 is stopped.

The control unit 100 determines whether or not the exhaustion of gas has been completed, for example, on the basis of a pressure value measured inside the cryopump 10. For example, while the pressure inside the cryopump 10 is in excess of a predetermined threshold value, the control unit 100 continues the discharging process. In the case where the pressure value falls below the threshold value, the control unit 100 ends the discharging process and starts the cooling process.

The cooling process re-cools the cryopanel in order to restart the vacuum pumping operation (S14). The cooling operation of the refrigerator 16 is started. The control unit 100 determines whether or not a measured value of the stage temperature has reached a target cooling temperature for the vacuum pumping operation. The control unit 100 continues the cooling process until the measured value reaches the target cooling temperature, and ends the cooling process in the case where the measured value has reached the cooling temperature. The cooling process may be the same as the above-described cool-down process. In this manner, the regeneration procedure is completed. The vacuum pumping operation of the cryopump 10 is restarted.

Figure 3:
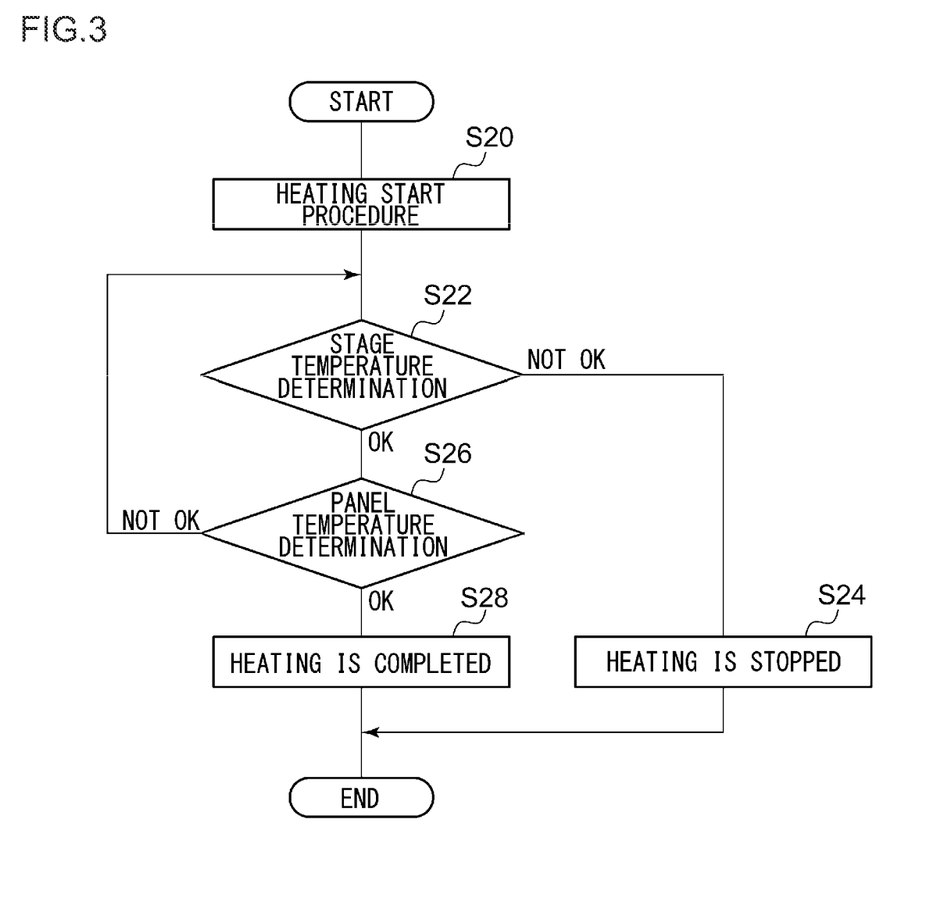
FIG. 3 shows a flowchart for illustrating a heating process according to an exemplary embodiment of the present invention.

FIG. 3 shows a flowchart for illustrating the heating process (S10) according to an exemplary embodiment of the present invention. As shown in FIG. 3, the heating process includes two determination steps, i.e., panel temperature determination (S26) and stage temperature determination (S22). The panel temperature determination (S26) is a completion determination of the heating process that determines whether the heating process is completed or not. The stage temperature determination (S22) is a determination step for protection of the refrigerator 16. The stage temperature determination (S22) may be inessential for the heating process of the present exemplary embodiment.

In the heating process, the control unit 100 first executes a heating start procedure (S20). The heating start procedure includes, for example, starting the heating operation of the refrigerator 16 (so-called reverse-rotation heating), and starting the supply of the purge gas to the cryopump 10. To heat the cryopanel at a high speed, the control unit 100 controls the refrigerator 16, for example, at the maximum operation frequency in the reverse-rotation heating. The control unit 100 opens the purge valve 74 so that the purge gas is introduced to the internal space 14 of the cryopump 10.

The control unit 100 executes the stage temperature determination (S22). The stage temperature determination is a procedure to monitor the temperature measured by the stage temperature sensor during the heating operation of the refrigerator 16. The control unit 100 determines whether or not the temperature measured by the stage temperature sensor has reached the warning temperature. More specifically, the control unit 100 determines that the temperature measured by the stage temperature sensor has reached the warning temperature, when at least one of the following conditions is satisfied: when the temperature measured by the first stage temperature sensor 90 reaches a first warning temperature; and when the temperature measured by the second stage temperature sensor 92 reaches a second warning temperature (NOT OK in S22).

The first warning temperature is set to be higher than the target temperature of the first panel 20. The second warning temperature is set to be higher than the target temperature of the second panel 18. The first warning temperature and the second warning temperature are set, for example, based on an upper temperature limit of the refrigerator 16. That is, the first warning temperature and the second warning temperature are set between the target temperature of the cryopanel and the upper temperature limit of the refrigerator 16. In the present exemplary embodiment, the first warning temperature and the second warning temperature are set to be a value obtained by deducting a predetermined margin from the upper temperature limit of the refrigerator 16. The first warning temperature may be equal to the second warning temperature.

When the control unit 100 determines that the temperature measured by the stage temperature sensor has reached the warning temperature (NOT OK in S22), the control unit 100 stops the heating operation of the refrigerator 16 (S24). The operation of the refrigerator 16 is stopped. The supply of the purge gas is stopped. Also, the control unit 100 may output a warning indicating that the refrigerator 16 has been approaching the upper temperature limit. In this manner, the refrigerator 16 can be protected. For example, seizure of a movable element in the refrigerator 16 (i.e., displacer) can be prevented.

On the other hand, when the control unit 100 determines that the temperature measured by the stage temperature sensor has not reached the warning temperature (OK in S22), the control unit 100 executes the panel temperature determination (S26). The control unit 100 determines whether or not the temperature measured by the panel temperature sensor has reached the target temperature. The target temperature is selected from the above-described regeneration temperature (for example, about 290 K to about 300 K). The target temperature of the first panel 20 may be equal to or different from the target temperature of the second panel 18.

More specifically, the control unit 100 determines whether or not the temperature measured by the first panel temperature sensor 94 has reached the target temperature of the first panel 20. The control unit 100 also determines whether or not the temperature measured by the second panel temperature sensor 96 has reached the target temperature of the second panel 18. When each of the temperatures measured by the first panel temperature sensor 94 and the second panel temperature sensor 96 has reached the target temperature, the control unit 100 determines that the temperature measured by the panel temperature sensor has reached the target temperature (OK in S26).

When the control unit 100 determines that the temperature measured by the panel temperature sensor has reached the target temperature (OK in S26), the control unit 100 completes the heating process (S28). The operation of the refrigerator 16 and the supply of the purge gas are stopped. Thereafter, as described above, the control unit 100 starts the discharging process (S12 in FIG. 2).

When the control unit 100 determines that the temperature measured by the panel temperature sensor has not reached the target temperature (NOT OK in S26), the control unit 100 continues the heating process. The heating operation of the refrigerator 16 and the supply of the purge gas are continued. After a predetermined time (for example, in the next control cycle), the control unit 100 executes the panel temperature determination (S26) and the stage temperature determination (S22) again.

When the heating operation of the refrigerator 16 is stopped (S24), the control unit 100 may wait for a predetermined period and restart the heating operation. By waiting, the heat is released from the refrigerator 16 so that the refrigerator 16 is cooled naturally. During the waiting, the supply of the purge gas may be continued. The control unit 100 may restart the heating operation, under the condition that the refrigerator 16 is cooled to a waiting temperature during the waiting. That is, the control unit 100 may restart the heating operation when the temperature measured by the stage temperature sensor falls below the waiting temperature. The waiting temperature is set to be a value obtained by deducting a predetermined margin from the warning temperature, for example.

During the vacuum pumping, the temperature distributions of the first panel 20 and the second panel 18 are relatively uniform. Therefore, the stage temperature successfully represents the panel temperature. However, that is not always true during the heating. During the heating, the stage temperature sensor measures the temperature of the heat source. Thus, the temperature measured by the stage temperature sensor tends to show a higher temperature than the actual temperature of the cryopanel.

If the heating process is completed based on the temperature measured by the stage temperature sensor, actually, the heating may be insufficiently completed with a low temperature part remaining in the cryopanel. To avoid that, there is a method in which the heating operation of the refrigerator 16 is continued for a while, after the stage temperature has reached the target temperature. Alternatively, there is a method in which the heating operation of the refrigerator 16 is completed, and only purging is continued. However, it is not easy to determine to stop the heating process, which is continued in this way, based on the temperature measured by the stage temperature sensor.

According to the present exemplary embodiment, the first panel temperature sensor 94 and the second panel temperature sensor 96 are respectively provided on the first panel 20 and the second panel 18, in locations away from the heat sources (i.e., the first stage 22 and the second stage 24). These locations have lower temperatures than other locations in the heating process. Therefore, the first panel temperature sensor 94 and the second panel temperature sensor 96 can respectively measure the temperatures of low temperature parts of the first panel 20 and the second panel 18.

The control unit 100 completes the heating process when the temperature measured by the first panel temperature sensor 94 has reached the target temperature of the first panel and the temperature measured by the second panel temperature sensor 96 has reached the target temperature of the second panel. That is, the control unit 100 completes the heating process when the measured temperature of the low temperature part of the cryopanel has reached the target temperature. Therefore, it is possible to appropriately stop the heating process without continuing it unnecessarily. According to the present exemplary embodiment, the heating time, and, further, the regeneration time can be shortened.

Figure 4:
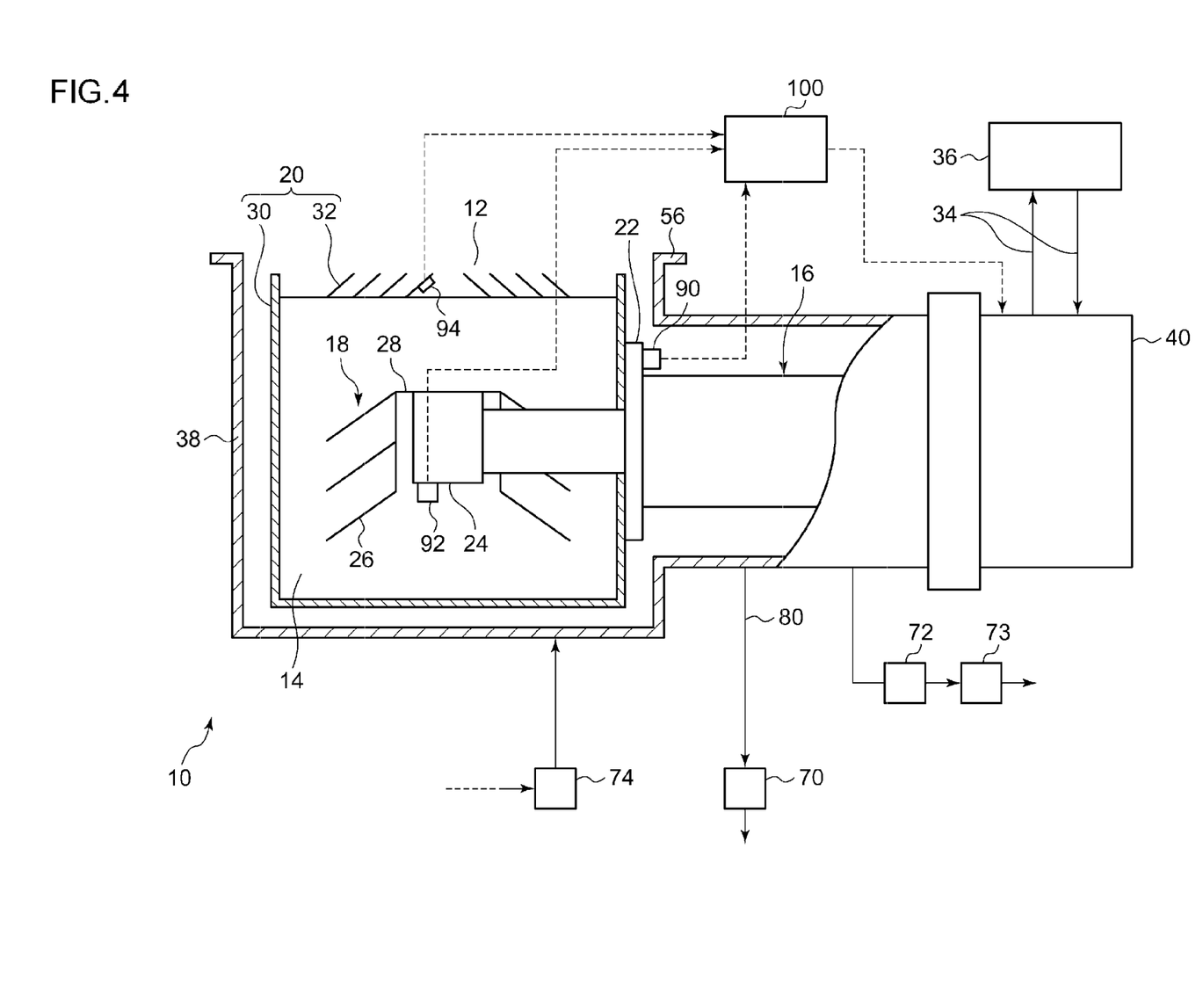
FIG. 4 schematically shows a cryopump according to another exemplary embodiment of the present invention.

FIG. 4 schematically shows a cryopump 10 according to another exemplary embodiment of the present invention. The cryopump 10 shown in FIG. 4 is different from the cryopump 10 shown in FIG. 1 in that the panel temperature sensor is provided only on the first panel 20. The cryopump 10 shown in FIG. 4 includes the first panel temperature sensor 94, but does not include the second panel temperature sensor 96. For the rest, the cryopump 10 shown in FIG. 4 and the cryopump 10 shown in FIG. 1 have a common configuration. Regarding the common parts, the explanation will be omitted for brevity.

The control unit 100 completes the heating process based on the temperature measured by the first panel temperature sensor 94. More specifically, the control unit 100 determines whether or not the temperature measured by the first panel temperature sensor 94 has reached the target temperature of the first panel 20. When the control unit 100 determines that the temperature measured by the first panel temperature sensor 94 has reached the target temperature, the control unit 100 completes the heating process.

Figure 5:
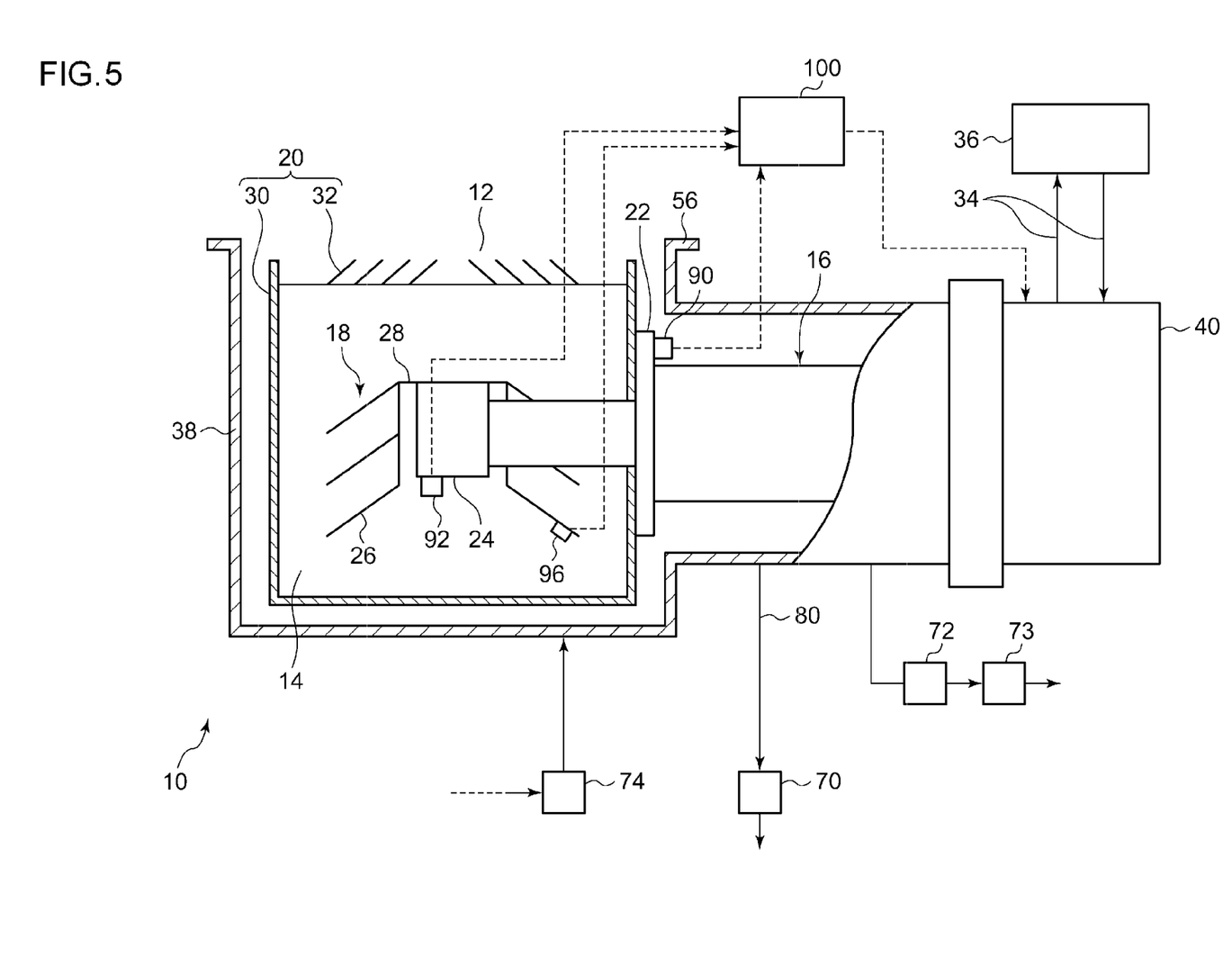
FIG. 5 schematically shows a cryopump according to still another exemplary embodiment of the present invention.

FIG. 5 schematically shows a cryopump 10 according to another exemplary embodiment of the present invention. The cryopump 10 shown in FIG. 5 is different from the cryopump 10 shown in FIG. 1 in that the panel temperature sensor is provided only on the second panel 18. The cryopump 10 shown in FIG. 5 includes the second panel temperature sensor 96, but does not include the first panel temperature sensor 94. For the rest, the cryopump 10 shown in FIG. 5 and the cryopump 10 shown in FIG. 1 has a common configuration. Regarding the common parts, the explanation will be omitted for brevity.

The control unit 100 completes the heating process based on the temperature measured by the second panel temperature sensor 96. More specifically, the control unit 100 determines whether or not the temperature measured by the second panel temperature sensor 96 has reached the target temperature of the second panel 18. When the control unit 100 determines that the temperature measured by the second panel temperature sensor 96 has reached the target temperature, the control unit 100 completes the heating process.

In the heating process, when the cryopump 10 is configured to allow the first panel 20 to reach its heating target temperature after the second panel 18 reaches its heating target temperature, the configuration shown in FIG. 4 can be adopted. On the other hand, in the heating process, when the cryopump 10 is configured to allow the second panel 18 to reach its heating target temperature after the first panel 20 reaches its heating target temperature, the configuration shown in FIG. 5 can be adopted. The configurations shown in FIGS. 4 and 5 have an advantage that they are simpler than the configuration shown in FIG. 1 in that the number of the panel temperature sensors may be one.

When designing a standard cryopump, it cannot be simply determined which one of the configurations in FIGS. 4 and 5 should be adopted. As actual circumstances in the cryopump industry, a plurality of models having different bores of the inlet 12 is offered to the market as a cryopump lineup having a standard specification. One of the plurality of models is designed under a common design concept to have a different bore diameter from another of the models. A cryopump 10 having a specific bore to be used is selected according to the use and the mounting place of the cryopump 10.

In such a standard cryopump, the time required to heat the first panel 20 is usually different from that for the second panel 18. Even when the heating of the first panel 20 and the heating of the second panel 18 start at the same time, the times to be completed are different. One of the main parameters to determine the heating time is the mass of the cryopanel. When the material of the cryopanel is the same, a heavy panel takes longer to be heated than a light panel. Therefore, the relation between the mass of the first panel 20 and the mass of the second panel 18 determines the order to complete the heating. The heavy panel tends to be late to complete the heating.

More accurately, the heating time depends on the mass of the cryopanel relative to the heating capability for the cryopanel (in other words, the cryopanel mass per unit heating capability). Here, the heating capability is an amount of heat per unit time to be given to the cryopanel. In the case of heating by a heater, a heating capability is an amount of heat per unit time to be given to the cryopanel from the heater. In the reverse-rotation heating, a heating capability is an amount of heat per unit time to be given to the cryopanel from a stage of the refrigerator. The heating capability in the reverse-rotation heating corresponds to, for example, a refrigeration capability of the stage of the refrigerator.

For example, when the mass of the second panel 18 relative to the heating capability (or the refrigeration capability) of the second stage 24 is larger than the mass of the first panel 20 relative to the heating capability (or the refrigeration capability) of the first stage 22, the second panel 18 takes longer to be heated than the first panel 20. Conversely, the panel mass per unit heating capability in the first stage is larger than that in the second stage, the first panel 20 takes longer to be heated.

When a plurality of models is under a common design concept, the heating completion order of the first panel 20 and the second panel 18 seems to be the same between the plurality of models. Between the plurality of models, for example, if the heating completion of the first panel 20 is late in common, it may be determined, by the measured temperature of the first panel 20, that the heating is completed. However, in actual fact, the first panel 20 is heated after the second panel 18 in one model among the plurality of models having different bores, while the first panel 20 is not always heated after the second panel 18 in other model.

Also, the bore of the cryopump 10 may have an effect on the relation between the mass of the first panel 20 and that of the second panel 18. In the design of one standard cryopump 10, when the pump bore becomes larger, the mass of second panel 18 tends to increase more than the mass of the first panel 20. This is because of a kind of scale effect. The first panel 20 has a shape of a tube along the housing 38, and the second panel 18 occupies the central part of the same. When the bore becomes larger, the mass of the first panel 20 tends to increase as a function of the surface area of the pump internal space 14, and the mass of the second panel 18 tends to increase as a function of the volume of the internal space 14. Therefore, the mass of the second panel 18 is likely to increase greater. A cryopump with a small bore has a small mass ratio of second-panel/first-panel, and a cryopump with a large bore has a large mass ratio of second-panel/first-panel.

In this case, the first panel 20 is heated late in the cryopump with a small bore because it has a small mass ratio of second/first. For example, a cryopump of 8 inches takes longer to heat the first panel 20. In contrast, the second panel 18 is heated late in the cryopump with a large bore because it has a large mass ratio of second/first. For example, a cryopump of 12 inches takes longer to heat the second panel 18. At a boundary value of a mass ratio, the heating completion order is transposed.

In a general cryopump, a control procedure for the regeneration is optimally designed for each of the models individually or the optimal procedure in a different model is used as is (or with slight adjustments). Optimal designing for individual models is time-consuming and burdensome. The optimal procedure for the different model does not ensure an appropriate use. Especially, when the heating completion orders of second/first are different between the two models, the same procedure should not be used.

In the control unit 100 of the cryopump 10 shown in FIGS. 4 and 5, a setting of a place to measure the temperature for determining the completion of the heating process is configured to be selectable for each model of the cryopump. More specifically, the setting is configured to select which one of the first panel 20 or the second panel 18 is set to be the place to measure the temperature (which one of the first panel temperature sensor 94 or the second panel temperature sensor 96 is used for determining the completion of the heating process). By an appropriate setting, the heating process may be shortened for each model.

The control unit 100 stores a model name in connection with a temperature sensor setting for determining the completion of the heating. The model name may be the value of bore diameter (when one diameter value represents one specific model or models having a common order of the heating). These are set at the manufacturing process of the cryopump 10 (or at the designing process, or the mounting process on site). When the cryopump 10 is in use, the setting is not changed.

The control unit 100 may be standardized regarding the settings other than the temperature sensor setting for determining the completion of the heating, without any variation among models. For example, the temperature sensors used during the vacuum pumping operation are standardized. For example, the first stage temperature sensor 90 is fixed as the temperature sensor for the first-stage temperature control. In this way, the control device, which is shared by the plurality of the models of the cryopumps, is provided.

Given above is an explanation based on the exemplary embodiment of the present invention. The exemplary embodiment described above is intended to be illustrative only and it will be obvious to those skilled in the art that various modifications could be developed and that such modifications are also within the scope of the present invention.

For example, the first panel temperature sensor 94 may be mounted on an arbitrary part of the first panel 20, and the second panel temperature sensor 96 may be mounted on an arbitrary part of the second panel 18. For example, when the temperature of a low temperature part of the panel can be estimated, it is not necessary to provide the panel temperature sensor on the end part of the heat transfer path.

In the exemplary embodiment shown in FIGS. 4 and 5, the temperature sensor for determining the completion of the heating is predetermined. As the exemplary embodiment shown in FIG. 1, however, in the configuration having a plurality of panel temperature sensors, the temperature sensor for determining the completion of the heating may be determined during the heating. The control unit 100 may monitor the plurality of panel temperature sensors during the heating and determine the completion of the heating process based on the selected panel temperature sensor.

At the beginning of the heating, the temperature measured by the first panel temperature sensor 94 is higher than the temperature measured by the second panel temperature sensor 96 (i.e., first temperature>second temperature). When the relationship between the two temperatures above is reversed during the heating, (i.e., first temperature<second temperature), the heating speed of the first panel 20 is clearly slow. Therefore, by using the first panel temperature sensor 94, the completion of the heating process can be determined. When such a reverse is not detected, on the other hand, the completion of the heating process can be determined by using the second panel temperature sensor 96.

In an embodiment, the heating process may include a rapid heating and a slow heating. The rapid heating heats the cryopanels at a relatively high speed from a cooling temperature of the cryopanel during the cooling operation (i.e., from the beginning of the heating) to a threshold temperature for switching the heating speed. The slow heating heats the cryopanels at a speed lower than that of the rapid heating from the switching temperature to the regeneration temperature. The threshold temperature for switching the heating speed is, for example, a temperature selected from a temperature range of 200 K to 250 K. The control unit 100 may determine the completion of the rapid heating (i.e., switching from the rapid heating to the slow heating) based on the temperature measured by the panel temperature sensor.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-037239, filed on Feb. 23, 2012, the entire content of which is incorporated herein by reference.

What is claimed is:

1. A cryopump comprising:
a refrigerator comprising a first stage to be cooled to a first stage cryogenic temperature and a second stage to be cooled to a second stage cryogenic temperature lower than the first stage cryogenic temperature;
a cryopanel comprising a first panel to be cooled by the first stage and a second panel to be cooled by the second stage;
a panel temperature sensor provided with at least one of the first panel and the second panel, the panel temperature sensor being capable of measuring a room temperature and incapable of measuring the first and second stage cryogenic temperatures;
a first stage temperature sensor directly mounted on the first stage and being capable of measuring the first cryogenic temperature; and
a common control unit communicably connected to the panel temperature sensor and the first stage temperature sensor and configured to control a cooling process of the cryopanel for vacuum pumping based on a stage temperature measured by the first stage temperature sensor and to control a heating process of the cryopanel for a regeneration of the cryopump based at least on a panel temperature measured by the panel temperature sensor, the control unit configured to determine completion of the heating process based exclusively on the panel temperature measured by the panel temperature sensor.

2. The cryopump according to claim 1, wherein the control unit controls a heating operation of the refrigerator to heat the cryopanel and monitors the temperature measured by the stage temperature sensor during the heating operation, wherein the control unit stops the heating operation of the refrigerator when the temperature measured by the stage temperature sensor reaches a warning temperature.

3. The cryopump according to claim 1, wherein the panel temperature sensor has a measurable temperature range including a heating target temperature in the heating process, and the measurable temperature range is a temperature range higher than a cooling target temperature of the cryopanel in the vacuum pumping.

4. The cryopump according to claim 1, comprising: a first panel temperature sensor provided on an end part of a heat transfer path in the first panel; and a second panel temperature sensor provided on an end part of a heat transfer path in the second panel, wherein
the control unit completes the heating process when a temperature measured by the first panel temperature sensor reaches a first panel target temperature and a temperature measured by the second panel temperature sensor reaches a second panel target temperature.

5. The cryopump according to claim 1, wherein the cryopanel is configured such that, during the heating process, the first panel reaches a heating target temperature after the second panel, wherein
the panel temperature sensor is provided at least with the first panel,
the control unit completes the heating process based on a measured temperature of the first panel.

6. The cryopump according to claim 1, wherein the cryopanel is configured such that, during the heating process, the second panel reaches a heating target temperature after the first panel, wherein
the panel temperature sensor is provided at least with the second panel,
the control unit completes the heating process based on a measured temperature of the second panel.

7. The cryopump according to claim 1, wherein the control unit configured to determine completion of the cooling process based exclusively on the stage temperature measured by the stage temperature sensor.

8. The cryopump according to claim 1, wherein the first stage temperature sensor has a first measurable temperature range including the room temperature and the first stage cryogenic temperature, and wherein the panel temperature sensor has a second measurable temperature range including the room temperature and being narrower than the first measurable temperature range.

9. The cryopump according to claim 1, wherein the panel temperature sensor comprises a first panel temperature sensor mounted directly on the first panel.

10. The cryopump according to claim 1, wherein the first stage temperature sensor is a first type temperature sensor and the panel temperature sensor is a second different type temperature sensor.

11. The cryopump according to claim 1, wherein the panel temperature sensor is a general-purpose temperature sensor.

12. The cryopump according to claim 1, wherein the panel temperature sensor is a thermocouple.

13. A method of regenerating a cryopump, the method comprising:
controlling a cooling process of a cryopanel comprising a first panel and a second panel for vacuum pumping based on a stage temperature measured by a first stage temperature sensor directly mounted on the first stage and being capable of measuring a first cryogenic temperature, wherein the first panel and the second panel are cooled to the first stage cryogenic temperature and a second stage cryogenic temperature lower than the first stage cryogenic temperature, respectively;

controlling a heating process of the cryopanel for a regeneration of the cryopump based at least on a panel temperature measured by a panel temperature sensor being capable of measuring a room temperature and incapable of measuring the first and second stage cryogenic temperatures; and determining completion of the heating process based exclusively on the panel temperature measured by the panel temperature sensor, wherein a common control unit communicably connects the panel temperature sensor and the first stage temperature sensor.

* * * * *